United States Patent [19]

Sandy, Jr. et al.

[11] Patent Number: 4,573,866
[45] Date of Patent: Mar. 4, 1986

[54] SEALED SHROUD FOR ROTATING BODY

[75] Inventors: James J. Sandy, Jr., Palm Beach Gardens, Fla.; Brian P. Huth, East Hartford, Conn.

[73] Assignee: United Technologies Corporation, Hartford, Conn.

[21] Appl. No.: 490,696

[22] Filed: May 2, 1983

[51] Int. Cl.$^4$ .............................................. F01D 25/24
[52] U.S. Cl. .................................... 415/116; 415/217; 415/170 R
[58] Field of Search ............... 415/115, 116, 134, 138, 415/139, 170 R, 172 A, 178, 191, 199.5, 217

[56] References Cited

U.S. PATENT DOCUMENTS

| | | | |
|---|---|---|---|
| 3,391,904 | 7/1968 | Albert et al. | 415/116 X |
| 3,394,919 | 7/1968 | Catterfeld | 415/138 |
| 3,742,705 | 7/1973 | Sifford | 415/115 UX |
| 3,752,598 | 8/1973 | Bowers et al. | 415/217 X |
| 3,754,766 | 8/1973 | Asplund | 415/172 A X |
| 3,825,365 | 7/1974 | Peng | 415/116 X |
| 3,836,279 | 9/1974 | Lee | 415/116 |
| 3,842,595 | 10/1974 | Smith et al. | 415/172 A X |
| 3,990,807 | 11/1976 | Sifford | 415/217 X |
| 4,157,232 | 6/1979 | Bobo et al. | 415/199.5 X |

Primary Examiner—Robert E. Garrett
Assistant Examiner—Joseph M. Pitko
Attorney, Agent, or Firm—Jack N. McCarthy

[57] ABSTRACT

An annular turbine blade tip shroud is provided having a construction for minimizing leakage of the cooling fluid and preventing ingestion of hot gases into said cooling flow. A tip shroud support ring is located on the inner surface of said casing with tip shroud members affixed thereto and encasing the blade tips. An annular metal can is located over the forward ends of said tip shroud members and has a sealing engagement with the tip shroud support ring. This annular metal can also seals with feather seals located between adjacent ends of cooperating tip shroud members. A positive metal bellows seal is also provided between downstream vanes and the outer casing. A sheet metal seal is located between each tip shroud member and tip shroud support ring to aid in maintaining proper cooling flow through the shroud.

11 Claims, 6 Drawing Figures

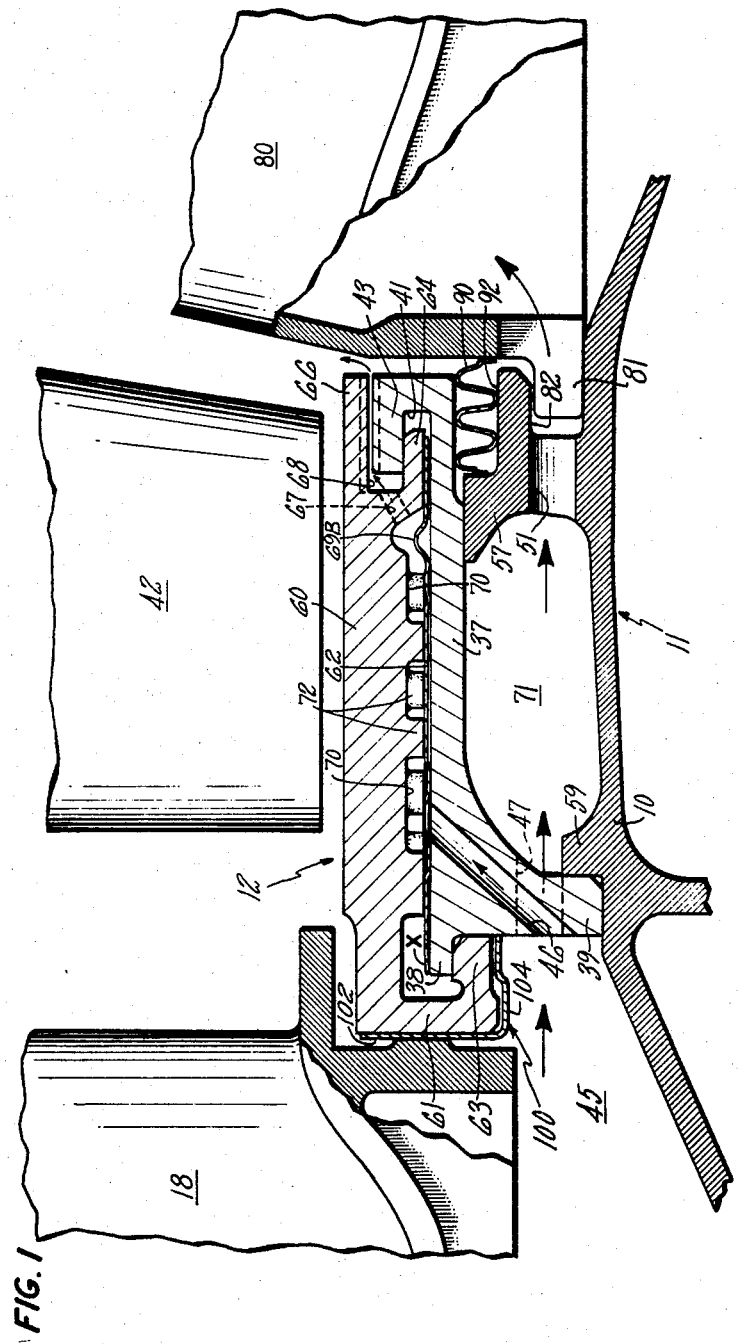
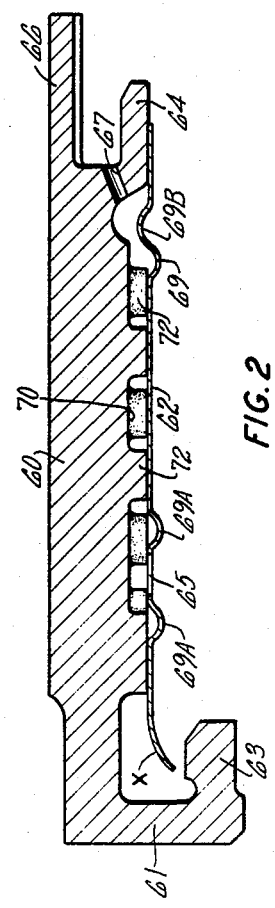
FIG. 1
FIG. 2

SEALED SHROUD FOR ROTATING BODY

TECHNICAL FIELD

This invention relates to a shroud for rotating bodies and particularly to a turbine blade shroud in an aircraft engine for improving cooling flow therethrough and reducing leakage.

BACKGROUND ART

In this art many different types of shrouds have been used. Some patents which are representative are: U.S. Pat. Nos. 3,391,904; 2,859,934; 3,443,791; 3,742,705; 3,752,598; and 3,990,807.

DISCLOSURE OF INVENTION

An object of the present invention is to have a tip shroud cooling scheme between blade tips and surrounding shroud and to have a cooling flow over the shroud and a separate positive cooling path to a vane downstream of said blades, said path providing positive outflow.

Another object of the present invention is to provide a positive seal between said downstream vane and the tip shroud support ring and turbine case flange.

A further object of this invention is to provide an annular can seal on the forward end of the tip shroud members to seal leakage therebetween. The rear circular edge of the cylindrical portion of the can seal contacts, and is held against, the tip shroud support ring while a flat forwardly extending flange is held between an outer rearwardly extending continuing projection formed by adjacent vanes and the forward end of the tip shroud members.

Another object of this invention is to have the tip shroud support ring with a forward outwardly extending positioning flange located to maintain a minimum temperature range between its inner end and its outer ends.

A further object of this invention is to provide feather seals between said tip shroud members which will also contact said annular can seal to further confine the flow path through said tip shroud members and prevent hot gas in-flow.

A further object of this invention is to provide a sheet metal shield, or seal, for sealing flow between said tip shroud members and the tip shroud support ring to prevent flow from escaping therebetween and confine it to its intended path.

A further object of the invention is to provide for the air flow passing over the shroud to exit through openings which are directed at a support hook at the rear end of the shroud support ring to cool the hook and prolong its life.

Another object of this invention is to have the forward part of the shroud members shield the duct support from direct impingement of hot gases. The shroud members are better able to handle a high temperature and subsequent deflections and stresses than the solid annular tip shroud support ring.

A further object of this invention is to provide interacting projections on the ends of cooperating tip shroud members to provide a circuitous path to aid in preventing hot gas in-flow; a cooling flow is directed into this path to further block hot flow between the tip shroud members.

BRIEF DESCRIPTION OF DRAWINGS

FIG. 1 is a sectional view of the invention showing the outer portions of the stationary vanes and a rotating blade along with the cooperating shroud construction;

FIG. 2 is an enlarged view of the tip shroud member of FIG. 1 with a sheet metal seal adjacent thereto before its assembly with the shroud support ring;

BEST MODE FOR CARRYING OUT THE INVENTION

Figure 3:
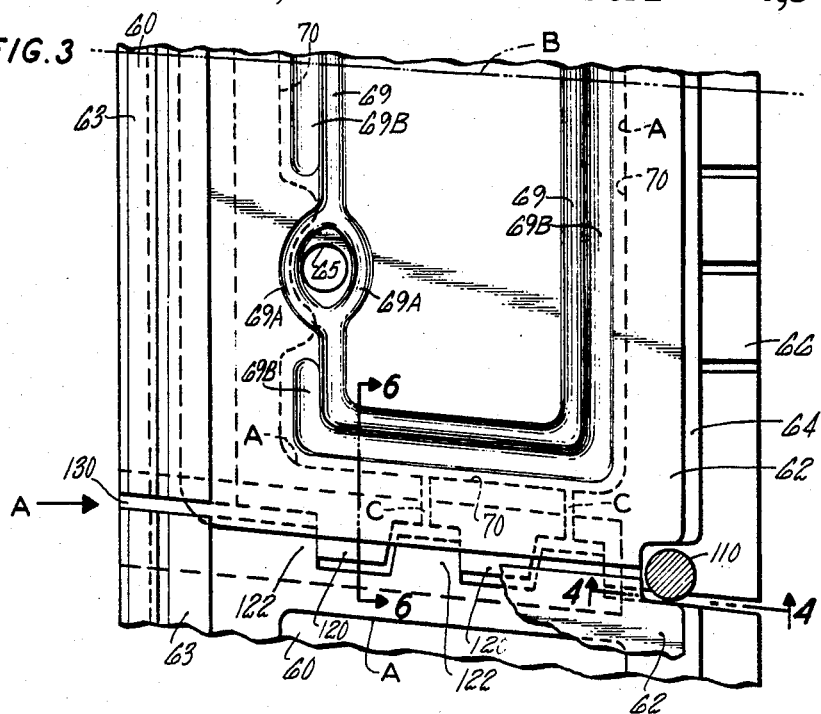
FIG. 3 is a fragmentary view of the shroud construction of FIG. 1 with two meeting tip shroud members engaging each other along with cooperating sheet metal seal, said view being taken from the outer diameter thereof with the can seal and tip shroud support ring removed.
Figure 4:
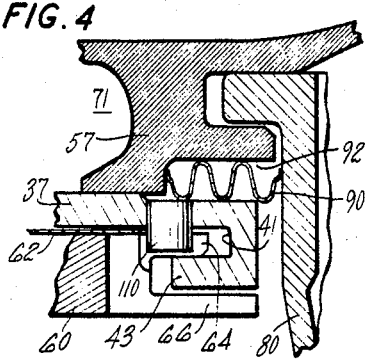
FIG. 4 is a view taken on the line 4—4 of FIG. 3 showing the fixed positioning of a retaining pin in the shroud support ring and the spring bellows seal between the outlet vanes and the outer casing.
Figure 6:
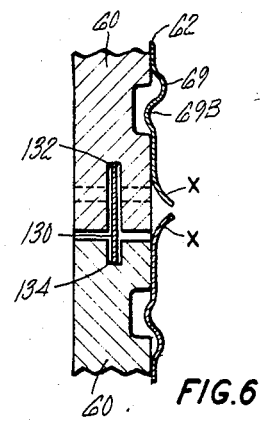
FIG. 6 is a view taken on the line 6—6 of FIG. 3 showing the feather seal and meeting ends of adjacent tip shroud members along with the cooperating sheet metal seals.
Figure 5:
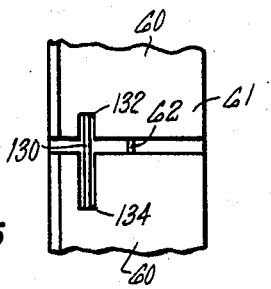
FIG. 5 is a view taken in the direction A of FIG. 3, showing the location of a "feather" or flat plate seal between meeting ends of adjacent tip shroud members.

The turbine section 11 shown in FIG. 1 is located in a similar environment as the turbine section of U.S. Pat. No. 3,826,084. This turbine section 11 comprises a gas path having first stage vanes 18, first stage blades 42 and second stage vanes 80. The inner unshown portions of the vanes 18 and 80 are supported by conventional turbine supports and blades 42 are mounted on a conventional rotor. The shroud construction 12 for the blades 42 includes a tip shroud support ring 37 which is formed as a ring member having an outwardly extending annular flange 39 at the forward edge thereof and an inwardly extending annular flange 43 on the rearward edge thereof. Said inwardly extending annular flange 43 has a forwardly facing annular slot 41 with its outer surface formed as an extension of the inner surface of the ring member. The tip shroud support ring 37 is supported adjacent its rearward end by the inner surface of an inwardly extending annular flange 57 which extends from the outer casing 10. The outer edge of flange 39 is positioned against said casing while the outer rearwardly facing edge is positioned against a short inwardly extending flange 59 which extends from the casing 10. When the tip shroud support ring 37 has its flange 39 placed against flange 59 of the casing 10, the tip shroud support ring 37 is in its proper position.

With the tip shroud support ring 37 in place, a plurality of tip shroud members 60 (35 have been suggested), each with a cooperating sheet metal seal 62, are placed in position around the inner surface of the tip shroud support ring 37 with said sheet metal seals 62 facing said inner surface. FIG. 2 shows a section through a tip shroud member 60 and cooperating sheet metal seal 62 before it has been pressed into place as shown in FIG. 1. Each sheet metal seal 62 is formed having a rib portion 69B pressed therein so that it projects inwardly from the face of the sheet metal seal 62 towards the outer surface of the cooperating tip shroud member. Each tip shroud member 60 has a recessed center portion 70 shown in FIG. 3 by the dotted line A. A plurality of pedestals 72 extend into the recessed center portion 70 to support the sheet metal seal 62 which is located against the cooperating tip shroud member 60. The rib portion 69B is formed to extend into said recessed portion 70 near its outer edge to properly position the sheet metal seal 62 on the tip shroud member 60. Each sheet metal seal 62 is formed having a second rib portion 69A pressed therein so that it projects outwardly from the face of the sheet metal seal 62 towards the inner surface of the tip shroud support ring 37. This rib portion 69A engages the inner surface of the tip shroud support ring 37 in a sealing manner to be hereinafter described.

The cooperating ends of tip shroud members 60 are formed having interacting projections 120 and 122 which cooperate to provide a circuitous path between the ends of the tip shroud members 60 to aid in preventing hot gas in-flow therethrough. The forward surfaces of projections 120 engage the rearward surfaces of projections 122 to form a positive seal. A cooling gas flow is directed into the area between the cooperating tip shroud members 60 at a point C downstream of the contacting surfaces to further block hot flow therebetween.

To provide for further sealing, a feather seal 130 is provided between the adjacent ends of tip shroud members 60. These feather, or plate, seals 130 are positioned in grooves 132 and 134 in confronting faces of tip shroud members 60. Each feather seal 130 extends from a point adjacent the forward end of slot 68 to the front edge of the tip shroud member 60. A type of feather, or plate, seal is discussed in detail in U.S. Pat. No. 3,752,598.

A first projection 64 extends rearwardly from each tip shroud member 60 and is positioned in the groove 41 of the flange 43, contacting the inner surface of the groove 41 and being spaced from the outer surface along with said attached sheet metal seal 62. A second projection 66 extends rearwardly from each tip shroud member 60 and is spaced inwardly from the first projection 64. A slot 68 is formed between the first projection 64 and the second projection 66. The portion of annular flange 43 outwardly of annular slot 41 projects into slot 68, the inner surface of flange 43 being spaced from the outer surface of the second projection 66. Grooves, as shown by the dotted lines, extend for the length of the second projections 66 and also along the inner surface of the flange 43 to insure a flow therebetween, to be hereinafter described.

The forward part of each tip shroud member 60 projects forwardly of a forwardly projecting annular flange 38 on tip shroud support ring 37. The forward end of each tip shroud member 60 has a downwardly extending flange 61 which extends outwardly past annular flange 38, and each downwardly extending flange 61 has a rearwardly extending flange 63 extending over the forwardly extending annular flange 38 with its inner surface contacting the outer surface of annular flange 38 and each rearward end contacting the forward surface of flange 39 of tip shroud support ring 37. The rearwardly extending flanges 63 of the tip shroud members 60 properly position them on the tip shroud support ring 37 with the sheet metal seals 62 being positioned facing the inner surface of the tip shroud support ring 37.

It can be seen that a fluid under pressure entering the cavity 45 will flow through passageways 46 and 47 in flange 39 of tip shroud support ring 37. Passageway 46 extends from the front of the flange 39 inwardly to the inner surface of the ring 37, which is adjacent the sheet metal seal 62 of each tip shroud member 60. Two passageways 46 are provided for each tip shroud member 60 and seal 62 (see FIG. 3 where one-half of a tip shroud member 60 and attached sheet metal seal 62 is shown with B representing a mid-line). A hole 65 is provided in each sheet metal seal 62 to align with the end of each cooperating passageway 46; this permits flow in each passageway 46 to pass through the seal 62 into the forward part of the cooperating recessed center portion 70 of each tip shroud member 60. This cooling flow passes rearwardly around pedestals 72 to the rear of recessed center portion 70 to a plurality of passageways 67 (6 have been suggested) extending from the recessed center portion 70 to the forward part of slot 68. This flow then passes between second projection 66 and the inner surface of cooperating flange 43 to be discharged against the forward part of vanes 80.

The rib portion 69 is deformed against the inner surface of shroud support ring 37 which presses the sheet metal seal 62 against the adjacent surface of its cooperating tip shroud member 60; the rib portion 69 is formed in two parts at 69A to extend around each hole 65. This provides a positive seal around each hole 65. While this arrangement forces the sheet metal seal 62 against its cooperating tip shroud member 60, each edge portion of the seal 62 and tip shroud member 60 can be brazed, if desired. The forward and side edges of the sheet metal seal 62 are formed curving outwardly at X so that when assembled they contact the shroud support ring 37 and are pressed thereagainst forming a seal (see FIG. 1). To insure proper alignment when assembled and prevent shifting of tip shroud members 60 and sheet metal seals around the tip shroud support ring 37, a pin 110 is properly positioned in tip shroud support ring 37 between each rearward mating edge of adjacent tip shroud members 60 and associated sheet metal seals 62; notches are provided to accommodate the pins, where necessary.

Passageways 47 (2 have been suggested) extend from the front of the flange 39 inwardly to an annular chamber 71 formed between tip shroud support ring 37 and the outer casing 10 including annular flange 57. The vanes 80 include flanges 81 at their upstream lower ends extending in an upstream direction and fitting into a downstream facing annular slot 82 formed in flange 57. Passageways 51 (2 have been suggested) extend from the rear of annular chamber 71 to the front of the annular slot 82; at each location of a passageway 51 the cooperating flange 81 is notched to permit flow thereby into an area below the vanes 80 to provide for flow into the vanes 80 for cooling. Openings can be placed at the trailing edges of the vanes 80 to permit cooling flow therefrom.

With the tip shroud support ring 37 in place with respect to the outer casing 10 and annular flange 57, a spring bellows seal 90 is placed in an annular groove 92 formed between the rear inner surface of flange 57 which supports the tip shroud support ring 37 and the rear inner surface of the tip shroud support ring 37. This spring bellows seal 90 has a forward annular engagement with the bottom of the annular groove 92 formed in flange 57 and a rearward annular engagement with the cooperating forward parts of the vanes 80. It can be seen that when these parts are properly mounted as shown in FIG. 1, the spring bellows seal 90 provides a positive sealing arrangement to prevent flow between the exit between second projection 66 and the inner surface of cooperating flange 43 and the end of passageways 51.

To reduce leakage from said tip shroud member 60 and the forward surface of flange 39, an annular metal can 100 is placed over the forward ends of the tip shroud members 60. The annular metal can 100 is formed of a flat annular portion 102 for engaging the front surface of downwardly extending flanges 61 and forward edges of feather seals 130, and a substantially cylindrical portion 104 for covering the outer surface of rearwardly extending flanges 63 and engaging and sealing with the front surface of the flange 39. The annular metal can 100 is formed having its substantially cylindrical portion 104 of a slightly greater length than the rearwardly extending flange 63 so that when the annular portion 102 is pressed against the front surface of downwardly extending flange 61, the edge of the substantially cylindrical portion 104 has a force constantly holding it against the front surface of flange 39, setting up a spring force in the cylindrical portion 104. It can be seen that this will prevent flow between the tip shroud member 60 and the tip shroud support ring 37 at the mating forward portions thereof.

We claim:

1. In combination with a turbine assembly mounted in an outer casing, a shroud for surrounding a stage of turbine blades between stationary inlet and outlet vanes, said shroud construction comprising a tip shroud support ring extending around the tips of the turbine blades and fixedly positioned on the outer engine casing, a plurality of tip shroud members mounted on the inner circumference of said shroud support ring, passageway means for directing a cooling fluid between said shroud support ring and said tip shroud members, the forward inner end of said shroud support ring having a cylindrical flange extending therefrom, the forward ends of each of the tip shroud members having attaching means slideable over said cylindrical flange, means attaching said rearward ends of said tip shroud members to said tip shroud support ring, an annular metal can positioned over the forward ends of said tip shroud members and enclosing them while the rearward edge of the can engages said tip shroud support ring to form a seal and prevent flow therebetween.

2. A combination as set forth in claim 1 wherein said annular metal can comprises a flat annular bottom with a substantially cylindrical rearwardly extending member attached to the outer edge thereof, said stationary inlet vanes contact and force the flat annular bottom of the metal can against the forward ends of said tip shroud members thereby forcing the rearward edge of the substantially cylindrical member against said tip shroud support ring.

3. A combination as set forth in claim 1 wherein adjacent mating ends of tip shroud members have grooves facing each other for a major portion of their length and extending from the forward ends thereof, a plate seal extending between said grooves and for the length of the grooves, the forward end of each plate seal contacting said annular metal can.

4. A combination as set forth in claim 3 wherein said annular metal can comprises a flat annular bottom with a substantially cylindrical rearwardly extending member attached to the outer edge thereof, said stationary inlet vanes contact and force the flat annular bottom of the metal can against the forward ends of said tip shroud members and the forward ends of said plate seals thereby forcing the rearward edge of the substantially cylindrical member against the tip shroud support ring.

5. A combination as set forth in claim 1 wherein said tip shroud support ring forms an annular chamber with said outer engine casing, a forward annular flange extends outwardly from said tip shroud support ring and engages said engine casing, an inwardly extending annular flange fixed to said engine casing engages the rear end of said tip shroud support ring, said inwardly extending flange on said engine casing having a groove for receiving forwardly extending flanges on the forward part of the outlet vanes for fixing the forward ends of said outlet vanes to said casing, a rearwardly facing annular recess being formed between the mating inwardly extending annular flange and said tip shroud support ring, said annular recess facing the forward ends of said outlet vanes, an annular metallic bellows seal is positioned in said annular recess with one end positioned against the bottom of said recess formed by said inwardly extending annular flange and the other end positioned against the forward part of said outlet vanes.

6. A combination as set forth in claim 1 wherein said tip shroud support ring forms an annular chamber with said outer engine casing, a forward annular flange extends outwardly from said tip shroud support ring and engages said engine casing, an inwardly extending annular flange fixed to said engine casing engages the rear end of said tip shroud support ring, each of said tip shroud members has a recessed center portion for permitting a flow of fluid therethrough, a sheet metal seal being positioned against each of said tip shroud members enclosing the recessed center portion, opening means in each sheet metal seal adjacent the forward part of said recessed center portion, first passage means connecting the forward part of said forward annular flange of said tip shroud support ring to each of said opening means, second passage means directing a flow from a location adjacent the rearward end of each recessed center portion to the rear end of said tip shroud support ring.

7. In combination with a turbine assembly mounted in an outer casing, a shroud for surrounding a stage of turbine blades between stationary inlet and outlet vanes, said shroud construction comprising a tip shroud support ring extending around the tips of the turbine blades and fixedly positioned on the outer engine casing, a plurality of tip shroud members mounted on the inner circumference of said shroud support ring, passageway means for directing a cooling fluid between said shroud support ring and said tip shroud members, the forward inner end of said shroud support ring having a cylindrical flange extending therefrom, the forward ends of each of the tip shroud members having attaching means slideable over said cylindrical flange, means attaching said rearward ends of said tip shroud members to said tip shroud support ring, an annular metal can positioned over the forward ends of said tip shroud members and enclosing them while the rearward edge of the can engages said tip shroud support ring to form a seal and prevent flow therebetween, said tip shroud support ring forms an annular chamber with said outer engine casing, a forward annular flange extends outwardly from said tip shroud support ring and engages said engine casing, an inwardly extending annular flange fixed to said engine casing engages the rear end of said tip shroud support ring, each of said tip shroud members has a recessed center portion for permitting a flow of fluid therethrough, a sheet metal seal being positioned against each of said tip shroud members enclosing the recessed center portion, opening means in each sheet metal seal adjacent the forward part of said recessed center portion, first passage means connecting the forward part of said forward annular flange of said tip shroud support ring to each of said opening means, second passage means directing a flow from a location adjacent the rearward end of each recessed center portion to the rear end of said tip shroud support ring, a third passage means connects the forward part of said forward annular flange of said tip shroud support ring to said annular chamber, fourth passage means directing flow from said annular chamber to the forward part of said outlet vanes, second opening means in said outlet vanes permitting flow from said fourth passage means to the interior of said outlet vanes.

8. In combination with a turbine assembly mounted in an outer casing, a shroud for surrounding a stage of turbine blades (42) between stationary inlet (18) and outlet (80) vanes, said shroud construction comprising a tip shroud support ring (37) extending around the tips of the turbine blades and fixedly positioned on the outer engine casing, a plurality of tip shroud members (60) mounted on the inner circumference of said shroud support ring, passageway means (46) for directing a cooling fluid between said shroud support ring and said tip shroud members, the forward inner end of said shroud support ring having a cylindrical flange (38) extending therefrom, the forward ends (61) of each of the tip shroud members having attaching means (63) slideable over said cylindrical flange, each attaching means having a front surface, means (43, 68) attaching said rearward ends of said tip shroud members to said tip shroud support ring, an annular metal can (100) positioned over the forward ends (61) of said tip shroud members (60) and enclosing them, said annular metal can (100) having a flat annular portion (102) for engaging the front surfaces of the forward ends of said tip shroud members, said annular metal can (100) having a substantially cylindrical rearwardly extending portion (104) engaging said tip shroud support ring (37) outwardly of said attaching means (63) to form a seal and prevent flow therebetween.

9. A combination as set forth in claim 8 wherein said attaching means (63) includes a rearwardly extending flange extending over said cylindrical flange (38) with an inner surface contacting the outer surface of said cylindrical flange (38), each rearward end of each rearwardly extending flange contacting the tip shroud support ring (37), said substantially cylindrical rearwardly extending portion (104) having a slightly greater length than the rearwardly extending flange of said attaching means (63) so that when said flat annular portion (102) engages the front surfaces of the forward ends of said tip shroud members the substantially cylindrical rearwardly extending portion (104) is held against the tip shroud support ring (37) by a spring force set up in said substantially cylindrical rearwardly extending portion (104).

10. A combination as set forth in claim 8 wherein said stationary inlet vanes (18) contact and force the flat annular portion (102) of the metal can (100) against the front surfaces of the forward ends of said tip shroud members thereby forcing the rearward edge of the substantially cylindrical rearwardly extending portion (104) against said tip shroud support ring (37).

11. A combination as set forth in claim 8 wherein said tip shroud support ring forms an annular chamber (71) with said outer engine casing, a forward annular flange (39) extends outwardly from said tip shroud support ring (37) and engages said engine casing, an inwardly extending annular flange (59) fixed to said engine casing engages the rear end of said tip shroud support ring (37), said passageway means (46) extending through said forward annular flange (39), a second passageway means (47) for directing a cooling fluid into said annular chamber (71), said second passageway means (47) extending through said annular flange (39), third passage means (51) directing flow from said annular chamber to said outlet vanes (80).

* * * * *